United States Patent [19]
Osborne

[11] Patent Number: 5,765,587
[45] Date of Patent: Jun. 16, 1998

[54] AUTOMATIC VALVES

[76] Inventor: Graham William Osborne, 74 Yarmouth Road, North Walsham, Norfolk, England, NR28 9AV

[21] Appl. No.: 849,997

[22] PCT Filed: Nov. 29, 1995

[86] PCT No.: PCT/GB95/02792

§ 371 Date: May 30, 1997

§ 102(e) Date: May 30, 1997

[87] PCT Pub. No.: WO96/17191

PCT Pub. Date: Jun. 6, 1996

[30] Foreign Application Priority Data

Dec. 1, 1994 [GB] United Kingdom .................. 9424294

[51] Int. Cl.⁶ ...................................... F16K 17/14
[52] U.S. Cl. ........................... 137/68.14; 137/68.12; 137/797; 285/4
[58] Field of Search .................. 137/68.14, 68.12, 137/75, 797; 285/4

[56] References Cited

U.S. PATENT DOCUMENTS

| | | | |
|---|---|---|---|
| 1,044,347 | 11/1912 | Carlson | 285/4 |
| 2,906,280 | 9/1959 | Mount | 137/68.14 |
| 2,962,035 | 11/1960 | Wright et al. | 137/68.14 |
| 2,965,116 | 12/1960 | Boone et al. | 137/68.14 |
| 3,489,160 | 1/1970 | Moore | 137/68.14 |
| 3,860,025 | 1/1975 | Nelson | 137/68.12 |
| 4,995,643 | 2/1991 | Rappart et al. | 285/4 |
| 5,193,569 | 3/1993 | Moore et al. | 137/68.14 |
| 5,244,006 | 9/1993 | Pettesch | 137/68.14 |

*Primary Examiner*—Denise L. Ferensic
*Assistant Examiner*—Joanne Y. Kim
*Attorney, Agent, or Firm*—Andrus, Sceales Starke & Sawall

[57] ABSTRACT

An automatically operating shut-off valve has a valve body (12) with a weakened zone (15) about which the body will break, in the event the valve is subjected to a shock load. A valve seat (25) is formed within the body (12) and a valve member (29) is pivoted to move between an open position and a closed position, against the valve seat. The valve member is spring-urged to its closed position but is held in its open position by a crank (34) having a pin (35) bearing on a brittle glass rod (33). The valve will close whenever the rod (33) breaks, even if the shock load is only sufficient to crack the valve body, about the weakened zone.

15 Claims, 3 Drawing Sheets

AUTOMATIC VALVES

This invention relates to an automatically-operating valve, intended to close off a flow passage through the valve in the event that the valve is subjected to a significant shear force. In particular, but not exclusively, the invention is intended for use in connection with the mounting of a forecourt liquid fuel dispensing pump, on to a supporting base.

Fuel pumps for dispensing petrol or diesel fuel into the tank of a motor vehicle generally comprise a self-contained unit mounted on a base or plinth on a garage forecourt, the pump being connected by way of a pipeline to an underground storage tank from which the fuel is drawn during operation of the pump. Some fuel pumps operate simply by suction, so that there is a sub-atmospheric pressure in the pipe from the underground tank to the pump, whenever the pump is in operation. Other systems employ a pressure-feed system where fuel in the pipeline from the tank to the pump is under pressure, to ensure a uniform delivery of fuel to the pump. This system may be employed when there is a relatively long pipeline from the underground tank to the pump.

It is unfortunate that not infrequently, vehicles manoeuvring on a garage forecourt collide with a fuel pump and displace the fuel pump from its proper position. In order to prevent significant fuel spillage (which could be most substantial in the case of a pressurised delivery system) it is the usual practice to fit a shear valve in the pipeline delivering fuel to the pump, in the vicinity of the mounting of the pump on to the base or plinth. An example of such a shear valve is shown in U.S. Pat. No. 3489160. This shear valve has a weakened zone so that if the pump is subjected to a lateral displacement, the valve will shear across its weakened zone. An automatically-operating valve member within the shear valve then closes the delivery pipeline to prevent leakage of fuel.

There is however a problem with the known design of shear valve; in the event that a fuel pump is subjected to a minor impact which is sufficient to cause the valve body to shear along its weakened zone but not sufficient to displace the fuel pump significantly from its normal position, it can happen that the valve member is not released so the flow passage through the valve body is not closed. As the valve body has sheared at its weakened zone, there results a significant leakage of fuel.

It is a principal aim of the present invention to address the above-described problem, and so to provide a valve wherein the closing of a flow passage through the valve can be assured in the event that the valve body shears about a weakened zone provided therein.

According to the present invention, there is provided an automatically-operating valve comprising a body defining a flow passage and having a weakened zone around that passage, a valve member mounted within the passage for movement towards a closed position where the valve member closes the passage on one side of the weakened zone, spring means urging the valve member to said closed position, a brittle frangible link bridging the weakened zone, and a control mechanism bearing on the frangible link and controlling movement of the valve member under the action of the spring means.

The shear valve of this invention will hereinafter further be described particularly with reference to its intended use with a forecourt petrol or diesel pump, though the valve may find uses in other industries—for example in a chemical manufacturing plant.

It will be appreciated that in the automatically-operating valve of the present invention, the closing of the flow passage through the valve body is controlled by a brittle frangible link which bridges the weakened zone. In the event that the valve body is subjected to sufficient force to shear the valve body at its weakened zone, the brittle frangible link inevitably will also break, so freeing the control mechanism to allow the valve member to move under the action of the spring means, thereby closing the flow passage. In this way, closing of the flow passage may be assured in the event that the valve body is subjected to a sufficient force to cause the valve body to shear at its weakened zone, even if there is no significant movement between the two parts of the sheared valve body.

Though the valve member could be arranged for linear sliding movement within the flow passage, it is preferred for the valve member to be pivotally mounted, for movement between an open position and said closed position, the valve member not significantly impeding flow through the flow passage when in its open position. The valve member may be mounted on a shaft which projects externally of the body, in which case the control mechanism may include a crank arm mounted on the shaft. The crank arm may have an abutment at or adjacent the end thereof remote from the shaft, which abutment may bear directly on the frangible link. In this way, upon the frangible link breaking, the abutment is no longer restrained against movement by the frangible link so freeing the crank arm, and in turn allowing the valve member to move to its closed position.

The frangible link preferably comprises a glass rod or tube. Such a link should be rigidly mounted on the valve body, to both sides of the weakened zone, whereby breakage of the link may be assured in the event that the valve body shears at that zone. In a preferred embodiment, a pair of lugs upstand from the valve body, one to each side of the weakened zone, each lug defining a respective slot for receiving an end portion of the frangible link and the frangible link being clamped or cemented in position, in the slots.

Conveniently, the spring means is disposed externally of the body and acts on the shaft on which the valve member is mounted, or on the crank arm connected thereto.

In an improved form of automatically-operating valve of this invention, the control mechanism includes a fusible link which melts at a predetermined low temperature, thereby freeing the valve member to move to its closed position under the action of the spring means. Alternatively, the frangible link could be arranged to soften, burst or break should the temperature in the vicinity of the valve rise significantly, so freeing the valve member. Either arrangement may give added protection against fuel leakage, in the event of a fire in the vicinity of the valve.

The part of the body defining a flow passage having a weakened zone may be formed as a separate unit removable from the remainder of the valve body, in order to allow easy repair in the event that the valve has been sheared by an external force. For example, said unit may include a pair of external flanges disposed therearound, at each end of the unit, which flanges may register with corresponding flanges formed on the remainder of the valve body and the respective flanges being bolted together in a fluid-tight manner. Then, in the event that the valve shears, the bolts may be released and the sheared unit removed from the remainder of the body, for replacement by an unbroken unit.

In yet another improved form of this invention, a float is provided in a catchment tank or tray provided below the pump, which float is coupled to a trip mechanism associated with the control means of the valve, whereby the valve will close in the event that any significant quantity of liquid accumulates in the tank or tray. Thus, even if there should be a small leak of fuel, the valve of this invention may act to close off the fuel supply to the pump.

Particularly when the valve is used for a forecourt fuel pump, it is an advantage to provide a second automatically-operating valve within the shear valve body and arranged to close the flow passage through the valve body on the side of the line of weakness opposed to that side which is closed by the above-described automatically-operating valve. Such a second valve may comprise a simple non-return valve. Alternatively, that second automatically-operating valve may be of substantially the same configuration as the first-mentioned automatically-operating valve described above, the second automatically-operating valve also being controlled by the same frangible link.

By way of example only, two specific embodiments of this invention will now be described in detail, reference being made to the accompanying drawings, in which.

Figure 1:
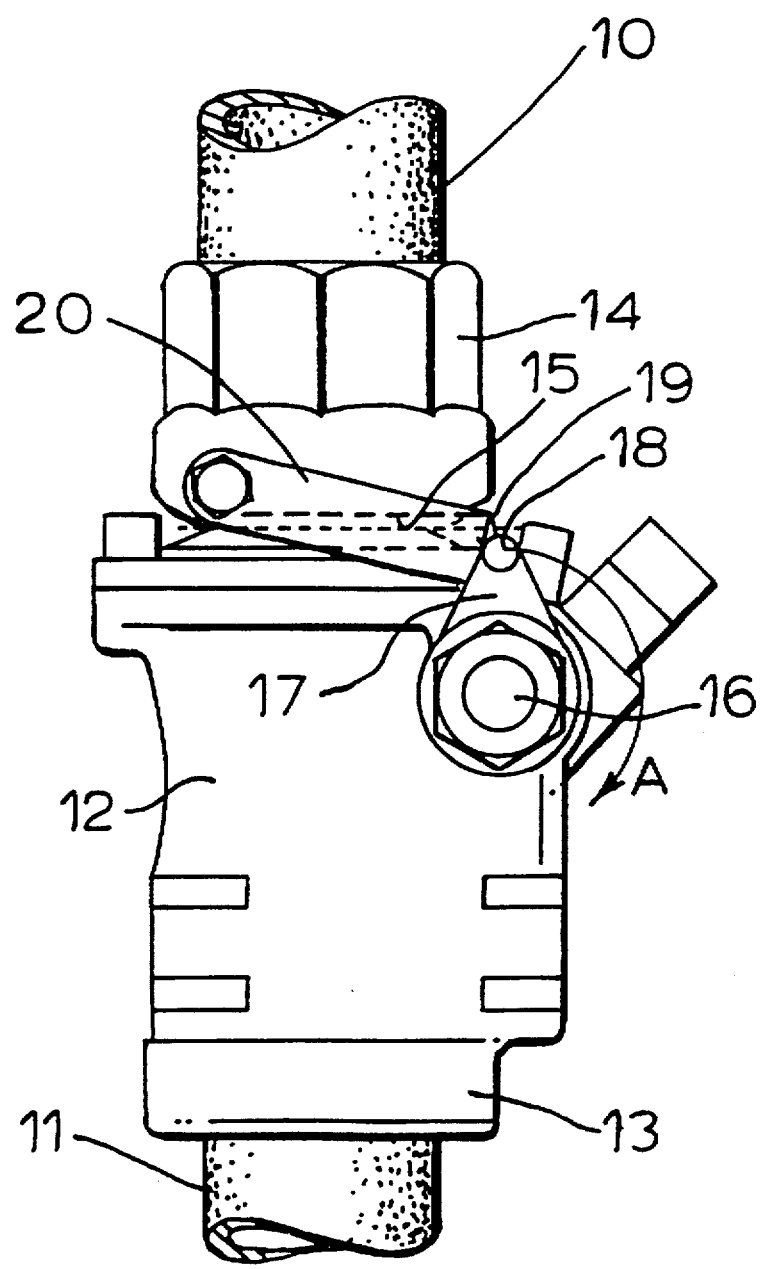
FIG. 1 is a side view of a known construction of automatically-operating shear valve, such as is widely used for the pipeline feeding fuel to a forecourt fuel pump.

Referring initially to FIG. 1, there is shown a known design of shear valve for use in connecting the inlet pipe 10 of a forecourt fuel pump to a pipeline 11 leading to the pump from an underground storage tank. The shear valve is intended to be installed at substantially the same level as the bottom of the fuel pump, where that pump is mounted on to a base or plinth. The shear valve comprises a body 12 which is internally threaded at its lower end 13 and is directly screwed on to the end of the pipeline 11 from the tank. The upper end of the body 12 carries a hexagonal boss 14 which also is internally threaded, and into which is screwed the inlet pipe 10 of the pump. Below the hexagonal boss 14, the wall thickness of the body 12 is greatly reduced, by means of a V-shaped annular groove 15 machined into the body 12, thereby defining a weakened zone around the body. Thus, in the event that the valve body 12 is subjected to a significant shear force, shearing of the body may be assured across that groove 15.

A shaft 16 extends through the valve body 12, below the groove 15, and supports internally of the body a valve member (not shown) which may move to a position where the valve member closes the flow passage through the valve body, below the groove, 15, upon rotation of the shaft from the position shown. Crank 17 projects radially from the shaft and carries a pin 18 at its free end, which pin is normally received in a slot 19 at the free end of an arm 20, pivoted to the body 12 above the groove 15. A coil spring (not shown) is provided around the shaft 16, to urge the shaft to rotate in the direction of arrow A, and so to move the valve member to its flow passage closing position.

It will be appreciated that upon shearing of the valve body, and provided the relative movement between the upper and lower valve body parts is greater than some predetermined minimum, pin 18 will come free of the slot 19 in arm 20, so allowing the shaft to rotate under the action of the spring and thus closing the flow passage through the valve. The problem arises when the shear valve is subjected to a shock sufficient to fracture the body about groove 15, but the pin 18 still remains in the slot 19 of the arm 20, so that the valve member is not freed to close the flow passage.

Figure 2:
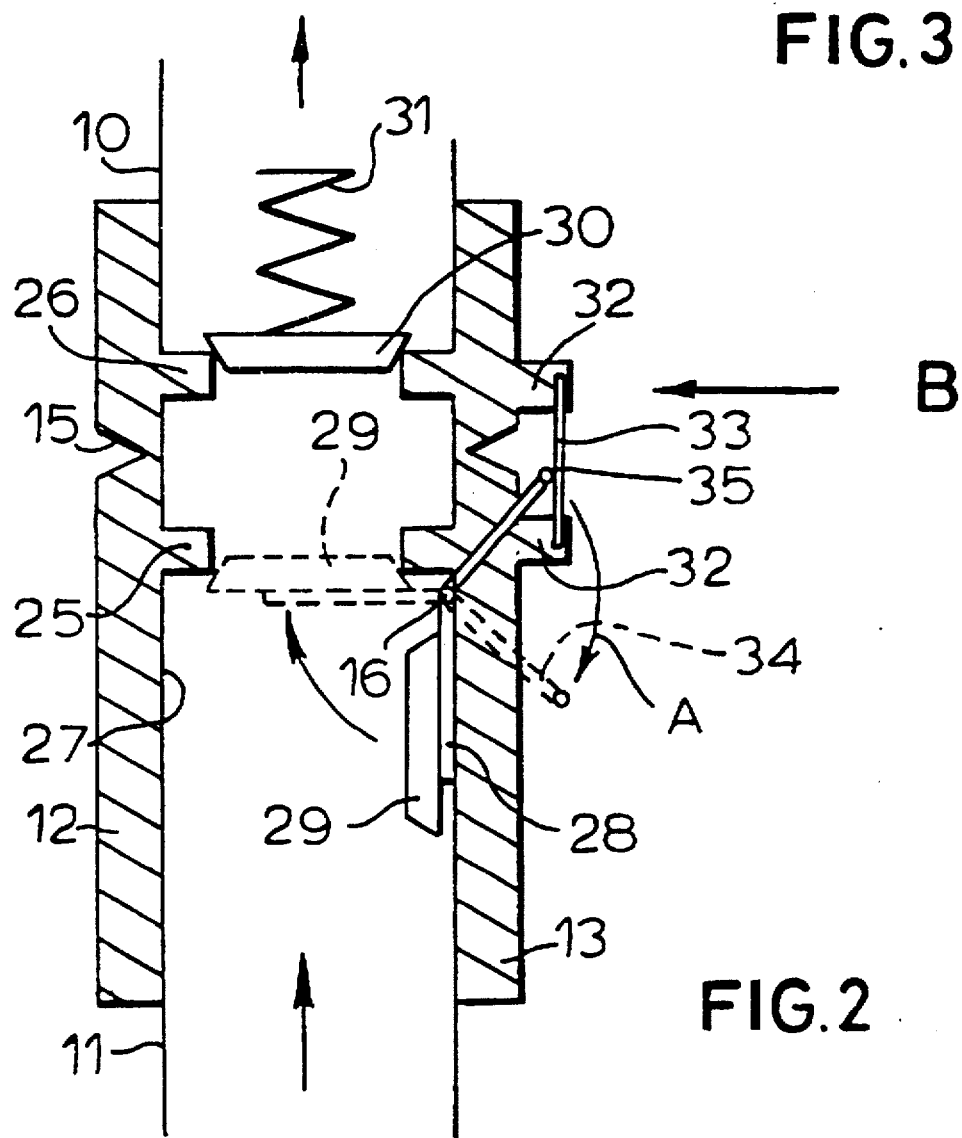
FIG. 2 is a diagrammatic sectional view through a first embodiment of automatically-operating valve constructed and arranged in accordance with the present invention.

FIG. 2 is a diagrammatic cross-section through a first embodiment of shear valve of the present invention and insofar as is approriate, like parts with those of FIG. 1 are given like reference characters. Internally of the flow passage 27 within the body 12, there is formed an annular valve seat 25 below the groove 15, and a second annular valve seat 26 above the groove 15. Within the flow passage, an arm 28 is rigidly connected to the shaft 16, the arm 28 carrying a circular valve member 29, movable upon rotation of the shaft 16 to the position shown in broken lines where the valve member seals against the valve seat 25 and so closes the flow passage 27.

A non-return valve comprising a valve member 30 directly urged by a spring 31 is arranged above the groove 15, to cooperate with the second valve seat 26. This non-return valve may not be required for all applications of the shear valve.

A pair of lugs 32 upstand from the valve body 12, one to each side of the groove 15. Each lug defines a slot in which is received a brittle glass rod 33, the rod being cemented at its two ends into the slots in the two lugs, respectively.

Externally of the body 12, the shaft 16 carries a crank 34, the free end of that crank supporting a peg 35 which bears against the glass rod 33. A spring (not shown) is arranged to urge the shaft 16 to rotate in the direction of arrow A. For example, the spring may comprise a coil spring wound round the shaft 16 and having one end anchored to the body 12 and its other end connected to the crank 34.

Figure 3:
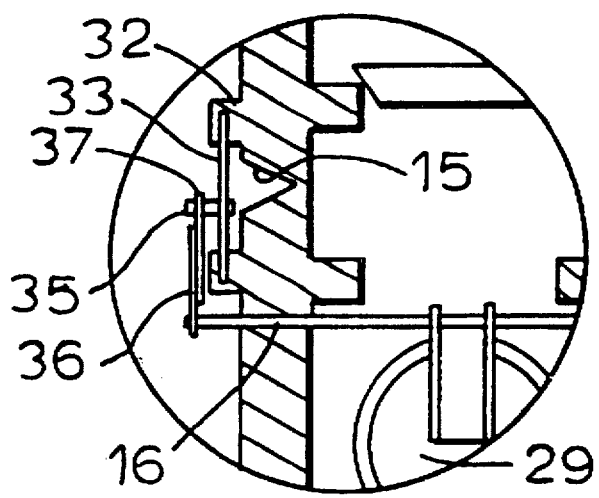
FIG. 3 is a detail view on a part of the valve of FIG. 2, taken in the direction of arrow B marked on FIG. 2.

As shown in FIG. 3, the crank 34 may be formed in two overlying parts 36 and 37, the arm parts being linked together by means of a low melting point adhesive whereby the arm parts will separate upon the temperature rising to some predetermined value. As an alternative, the glass rod 33 may be replaced by a brittle plastics material rod, which loses its rigidity and strength when the temperature rises above some predetermined value, so allowing shaft 16 to rotate.

During normal operation of the valve, the valve member 29 is in the position shown in solid lines in FIG. 2 and is constrained there by the peg 35 of the crank 34 bearing on the glass rod 33, notwithstanding the force of the spring acting on shaft 16. Should the valve body be subjected to a shock sufficient to shear the valve body across groove 15, the glass rod 33 inevitably will break so freeing crank 34 and allowing the valve member 29 to move to the position shown in broken lines, in FIG. 2. This action will occur even should there be only a very small displacement of the two parts of the valve body, upon fracture of the body. Equally, should there be a fire resulting in a temperature rise, the two arm parts 36 and 37 will separate and allow valve member 29 to move to a position where the flow passage 27 through the valve body is closed.

Figure 4:
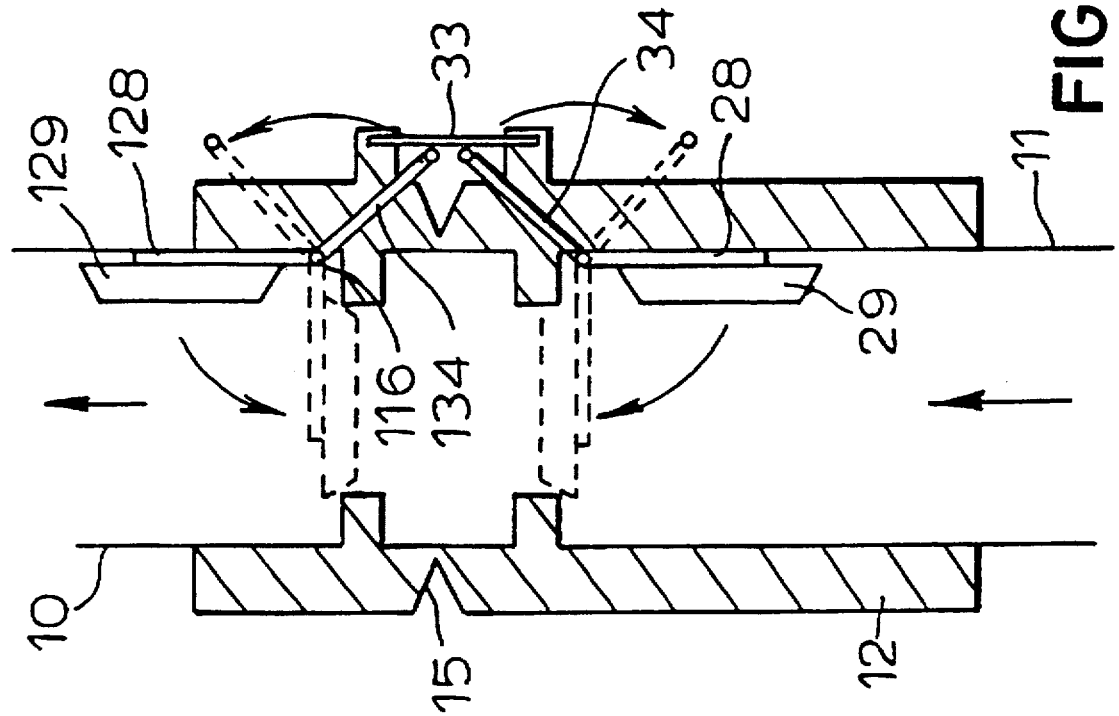
FIG. 4 is a sectional view through a second embodiment of automatically-operating valve of this invention.

FIG. 4 shows a modification of the valve assembly of FIGS. 2 and 3 and again like reference characters are used to indicate like parts. In this modified form of valve, the non-return valve comprised by valve member 30 and spring 31 is replaced by a second automatic valve described with reference to FIG. 2. Thus, this second valve comprises shaft 116, arm 128, valve member 129 and crank 134, the peg 135 of crank 134 bearing on the same glass rod 33 as does peg 35 of crank 34 of the first valve. The function of this second valve assembly is precisely the same as that of the first-mentioned assembly and will not be described in detail again here.

Figure 5:
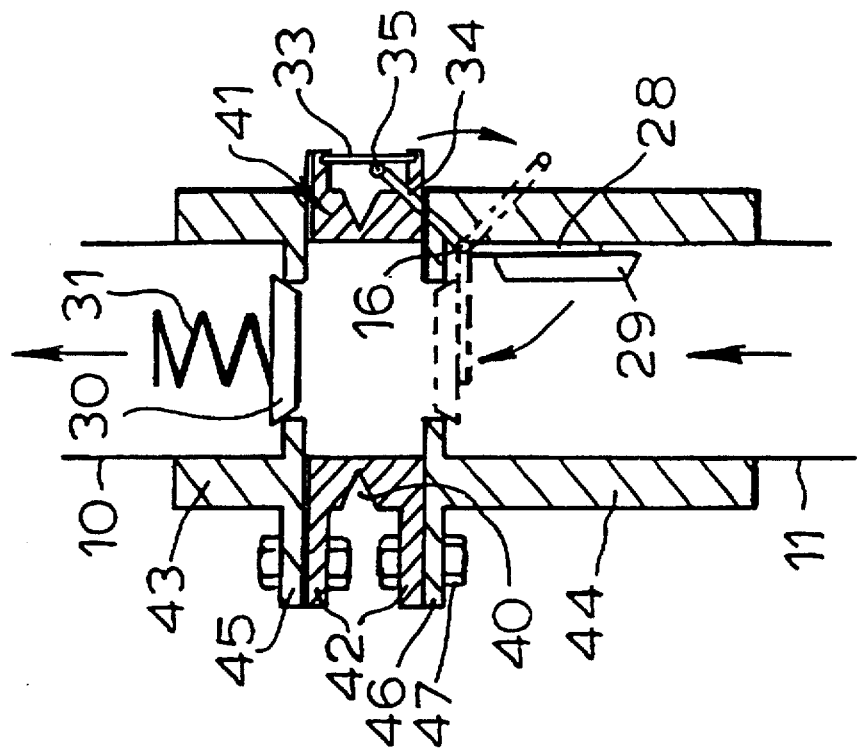
FIG. 5 shows a valve similar to that of FIG. 2, but including a removable unit to facilitate repair.

FIG. 5 shows a valve essentially similar to that of FIG. 2, but modified in order to facilitate the repair of the valve in the event that the valve is subjected to a sufficient force to shear the valve across the weakened zone. In FIG. 5, like reference characters are used to denote like parts with those of FIG. 2.

In this modified valve, the weakened zone 40 is formed in a separate unit 41, having at each end a respective external flange 42. The parts 43 and 44 of the valve body to each side of the unit 41 are formed with corresponding flanges 45 and 46, nuts and bolts 47 being used through registering holes in the flanges to secure the unit in position.

Pin 35, which acts against the link 33, is preferably made removable from arm 34, in order to facilitate servicing of the valve without breaking the link.

The function of the embodiment of FIG. 5 is the same as that as has been described above with reference to FIGS. 2 and 3 and will not be described again here. When the valve is subjected to a sufficient force to shear the unit 41 across its weakened zone 40, the nuts and bolts 47 may be removed and the unit 41 then slid out from between the two remaining body parts 43 and 44. Thereafter, a new unit may be slid into position and secured in a fluid-tight manner. It will be appreciated that this arrangement facilitates repair of the valve and there is no need to dismantle any pipe-work to effect that repair.

I claim:

1. An automatically-operating valve comprising a body defining a flow passage and having a weakened zone around that passage, a valve member mounted within the passage for movement towards a closed position where the valve member closes the passage on one side of the weakened zone, spring means urging the valve member to said closed position, a brittle frangible link bridging the weakened zone, and a control mechanism bearing on the frangible link and controlling movement of the valve member under the action of the spring means.

2. An automatically-operating valve as claimed in claim 1, wherein the valve member is pivotally mounted within the flow passage.

3. An automatically-operating valve as claimed in claim 2, wherein the valve member is mounted on a shaft which projects externally of the body, and the control mechanism includes a crank arm mounted on the shaft.

4. An automatically-operating valve as claimed in claim 3, wherein the crank arm has an abutment at or adjacent the end thereof remote from the shaft which abutment bears directly on the frangible link.

5. An automatically-operating valve as claimed in claim 1, wherein the control mechanism includes a thermally-sensitive link which fails at a predetermined temperature.

6. An automatically-operating valve as claimed in claim 3, wherein the crank arm comprises two arm parts joined together by a thermally-sensitive coupling which fails at a predetermined temperature.

7. An automatically-operating valve as claimed in claim 1, wherein the frangible link comprises a glass rod or tube.

8. An automatically-operating valve as claimed in claim 1 and in which the valve member is mounted on a shaft which projects externally of the body, wherein the spring force for the valve member is provided externally of the body.

9. An automatically-operating valve as claimed in claim 8, wherein the spring force is provided by a coil spring mounted around the shaft and having one end anchored on the body.

10. An automatically-operating valve as claimed in claim 1, wherein there is an annular valve seat within the flow passage to one side of the weakened zone, and the valve member is spring-urged to a position where the valve member engages the valve seat to close off the passage from the side of the valve seat further from the weakened zone.

11. An automatically-operating valve as claimed in claim 1, wherein there is another automatically-operating valve mounted within the passage, to the other side of the weakened zone in the body.

12. An automatically-operating valve as claimed in claim 10, wherein said another automatically-operating valve comprises a spring-loaded non-return valve.

13. An automatically-operating valve as claimed in claim 10, wherein said another automatically-operating valve comprises a further valve configured similarly to the aforesaid automatically-operating valve and having a control mechanism bearing on the same frangible link.

14. An automatically-operating valve as claimed in claim 1, wherein the weakened zone is formed in a part of the body formed as a separate unit removable from the remainder of the valve body.

15. An automatically-operating valve as claimed in claim 14 wherein said unit includes a pair of external flanges disposed therearound at each end of the unit, for registering with corresponding flanges formed on the remainder of the valve body.

* * * * *